June 16, 1931.  C. E. SCHIRMER  1,810,578
TROLLEY FOR HOISTS
Filed July 15, 1929
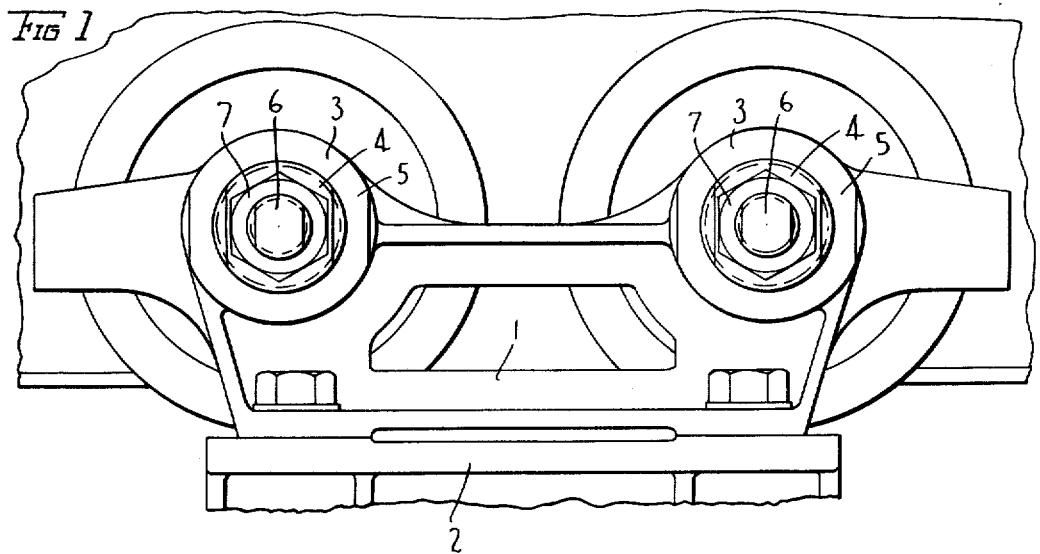
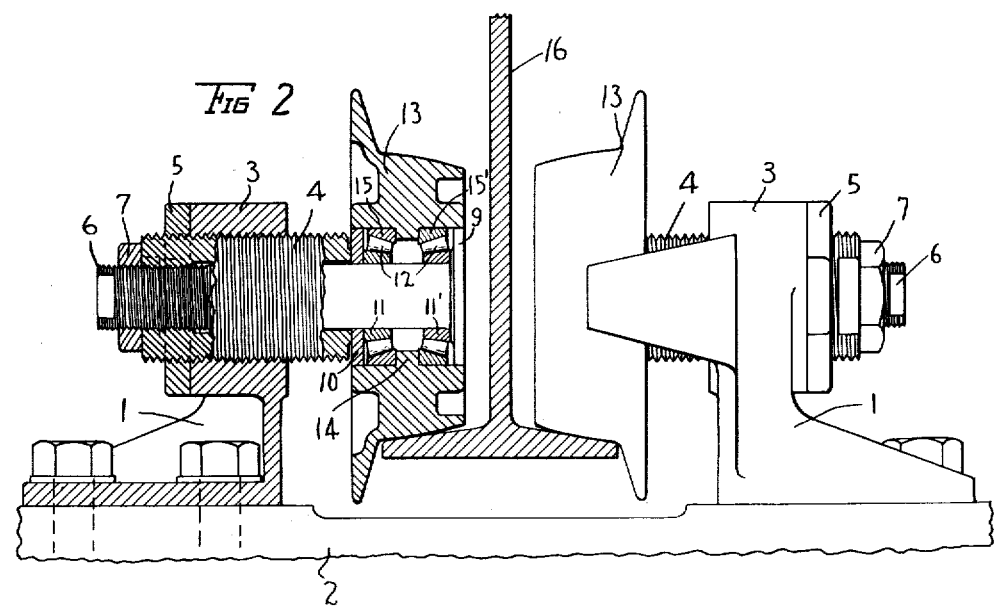
INVENTOR
Carl E. Schirmer
BY
ATTORNEYS Patented June 16, 1931

1,810,578

UNITED STATES PATENT OFFICE

CARL E. SCHIRMER, OF SPRINGFIELD, OHIO, ASSIGNOR TO ROBBINS & MEYERS, INC., OF SPRINGFIELD, OHIO, A CORPORATION OF OHIO

TROLLEY FOR HOISTS

Application filed July 15, 1929. Serial No. 378,401.

This invention relates to improvements in trolleys for hoists, it relating particularly to that type of trolley having pairs of wheels which run upon the lower horizontal flanges of an I-beam or special track and are journaled upon bearings.

The object of my invention is to provide simple and effective means for spacing the wheels with relation to each other to adapt them to different sized tracks.

A further object of the invention is to provide improved means for adjusting the bearings for the wheels.

In the accompanying drawings:

Fig. 1 is a side elevation of a trolley embodying my improvements.

Fig. 2 is a view partly in end elevation and partly in vertical section of the same.

Referring to the drawings, 1 represents the side frames of the trolley which in the present case are bolted to a supporting frame 2 which sustains the hoisting mechanism (not shown).

Each of the trolley frames 1 is provided in the present case with a pair of integral supporting heads 3, each of which has a threaded bore to receive the external threads of a sleeve 4. A lock nut 5 on the external threads of the sleeve furnishes the means for locking the sleeve to its head. The outer end of the sleeve has internal threads to receive the threads of a bolt 6; a lock nut 7 being provided to lock the bolt to the sleeve. The bolt projects beyond the inner end of the sleeve and between the head 9 of the bolt and a loose washer 10 placed at the end of the sleeve the bolt carries the inner tapered rings 11 and 11' for tapered roller bearings 12. The bore of the trolley wheel 13 which is mounted on these bearings has an annular centrally-arranged rib 14 forming a division wall and on each side of this wall is inserted an outer tapered race ring 15 and 15' for the tapered rolls.

The wheels 13 are in pairs which run upon the lower horizontal flanges of an I-beam 16 and in order to accommodate the wheels of a pair to beams of different sizes it is necessary to space the wheels at different distances apart. To accomplish this result with the devices described, the nuts 5 are loosened and the sleeves 4 turned in the heads to the required extent to properly space the wheels, the nut 5 being then tightened to hold the sleeves and wheels in adjusted position.

To adjust the bearings for any one wheel to take up wear the nut 7 is loosened and bolt 6 turned to cause its head to approach the inner end of the sleeve. The bolt heads have a bearing against the inner adjacent rings 11' only, there being space between this bolt head and the outer adjacent rings 15' which bear against the wall 14 of the trolley wheel. The wall 14 also bears only against the outer rings 15, while the inner rings 11 are held against movement by the washer. The movement of the bolt head therefore first slides the rings 11' to take up wear between these rings and the ones 15' and thereafter through the wall 14, slides the rings 15 to take up wear between such rings and the ones 11.

Having thus described my invention, I claim:

1. In a device of the character described, a wheel, adjustable anti-friction bearings for said wheel, adjustable devices for supporting said bearings and wheel, one adjustment of said devices acting to adjust said wheel and its bearings in an axial direction and another adjustment of said devices serving to take up wear in said bearings.

2. In a device of the character described, a supporting frame, a pair of wheels and anti-friction bearings for each wheel, said wheels arranged to run on the flanges of an I-beam, independent devices for supporting each wheel and its bearings, one adjustment of each of said devices acting to space said wheels with relation to each other and another adjustment of each of said devices acting to adjust the bearings of the associated wheel.

3. In a device of the character described, an internally threaded support, a sleeve threaded thereon having internal threads, a member threaded in said sleeve having a head, adjustable bearings carried by said member between said head and sleeve, a wheel mounted on said bearings, whereby turning of said sleeve in said support adjusts said wheel in an axial direction and turning of said member in said sleeve adjusts said bearings.

4. In a device of the character described, a support, a sleeve mounted in said support, means for axially adjusting said sleeve, a bolt carried solely by said sleeve, means for axially adjusting said bolt, said bolt projecting beyond said sleeve and having a head, adjustable bearings on said bolt confined between said bolt head and the adjacent end of said sleeve, and a wheel mounted on said bearings.

5. In a device of the character described, an internally threaded support, a sleeve having external threads adapted to be screwed in said support and adjusted axially thereon, said bolt projecting beyond said sleeve and having a head on the projecting end thereof, said sleeve also having internal screw-threads, a bolt having external threads adapted to be screwed therein, means for locking said sleeve and bolt in different positions of axial adjustment, adjustable bearings between said bolt head and said sleeve, and a wheel mounted on said bearings.

6. In a device of the character described, a stationary support having a threaded opening, a threaded member mounted in said opening, so as to be axially adjustable in either direction, anti-friction bearings carried by said member, connections whereby said anti-friction bearings will move with said member upon the axial adjustment thereof in either direction, and a wheel mounted upon said anti-friction bearings and movable therewith.

In testimony whereof, I have hereunto set my hand this 9th day of July, 1929.

CARL E. SCHIRMER.

of said sleeve in said support adjusts said wheel in an axial direction and turning of said member in said sleeve adjusts said bearings.

4. In a device of the character described, a support, a sleeve mounted in said support, means for axially adjusting said sleeve, a bolt carried solely by said sleeve, means for axially adjusting said bolt, said bolt projecting beyond said sleeve and having a head, adjustable bearings on said bolt confined between said bolt head and the adjacent end of said sleeve, and a wheel mounted on said bearings.

5. In a device of the character described, an internally threaded support, a sleeve having external threads adapted to be screwed in said support and adjusted axially thereon, said bolt projecting beyond said sleeve and having a head on the projecting end thereof, said sleeve also having internal screw-threads, a bolt having external threads adapted to be screwed therein, means for locking said sleeve and bolt in different positions of axial adjustment, adjustable bearings between said bolt head and said sleeve, and a wheel mounted on said bearings.

6. In a device of the character described, a stationary support having a threaded opening, a threaded member mounted in said opening, so as to be axially adjustable in either direction, anti-friction bearings carried by said member, connections whereby said anti-friction bearings will move with said member upon the axial adjustment thereof in either direction, and a wheel mounted upon said anti-friction bearings and movable therewith.

In testimony whereof, I have hereunto set my hand this 9th day of July, 1929.

CARL E. SCHIRMER.

CERTIFICATE OF CORRECTION.

Patent No. 1,810,578.   Granted June 16, 1931, to

CARL E. SCHIRMER.

It is hereby certified that the name of the assignee in the above numbered patent was erroneously written and printed as "Robbins & Meyers, Inc.", whereas said name should have been Robbins & Myers, Inc., as shown by the records of assignments in this office; and that the said Letters Patent should be read with this correction therein that the same may conform to the record of the case in the Patent Office.

Signed and sealed this 14th day of July, A. D. 1931.

(Seal)

M. J. Moore,
Acting Commissioner of Patents.

CERTIFICATE OF CORRECTION.

Patent No. 1,810,578.  Granted June 16, 1931, to

CARL E. SCHIRMER.

It is hereby certified that the name of the assignee in the above numbered patent was erroneously written and printed as "Robbins & Meyers, Inc.", whereas said name should have been Robbins & Myers, Inc., as shown by the records of assignments in this office; and that the said Letters Patent should be read with this correction therein that the same may conform to the record of the case in the Patent Office.

Signed and sealed this 14th day of July, A. D. 1931.

(Seal)

M. J. Moore,
Acting Commissioner of Patents.